J. PLUMB.
Land-Marker.
No. 52,598.
Patented Feb. 13. 1866.
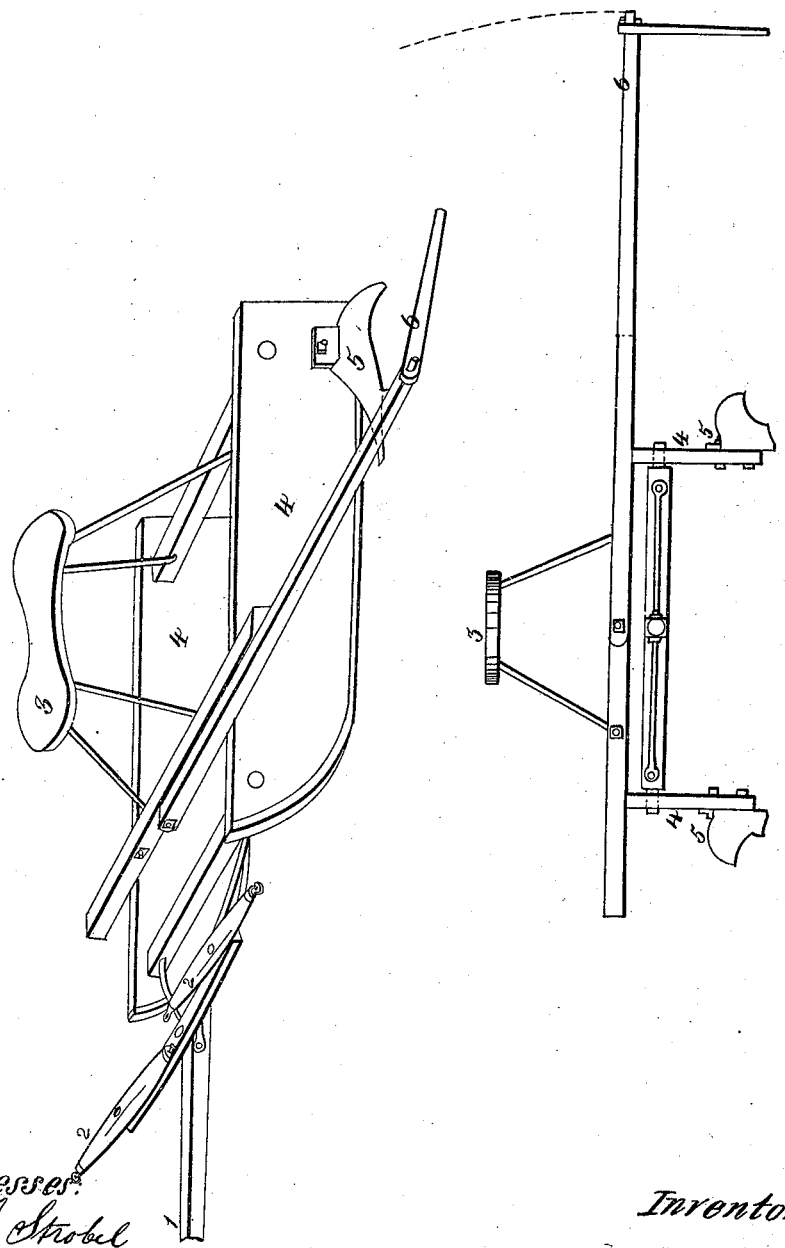
Witnesses:
P. A. Strobel
John F. Strobel
Inventor:
Joseph Plumb

UNITED STATES PATENT OFFICE.

JOSEPH PLUMB, OF CLARKSVILLE, NEW JERSEY.

IMPROVEMENT IN FURROWING DEVICES FOR CORN-PLANTING.

Specification forming part of Letters Patent No. 52,598, dated February 13, 1866.

*To all whom it may concern:*

Be it known that I, JOSEPH PLUMB, of the township of Lebanon, county of Hunterdon, and State of New Jersey, have invented a new and Improved Plow for Furrowing the Ground Preparatory to the Planting of Corn; and I do hereby declare that the following is a full and exact description thereof, reference being had to the accompanying drawings.

The plow is constructed somewhat in the form of a sled, the runners being from three and a half (3½) to four (4) feet apart. The runners are shod with iron two (2) inches wide and one (1) inch thick. To each of the runners is attached a small plow-mold of cast-iron. These runners so act, in connection with the plow-mold, as to make a furrow sufficiently deep to receive and retain the seed-corn so that it may be readily covered.

The defect in all the sleds for furrowing corn-ground now in use is that they skim lightly over the surface, really make no furrow, and leave the ground on which the seed-corn is dropped quite hard, and the corn germinates very poorly. All this is corrected by this new furrowing-plow, as it not only opens a furrow of sufficient depth to receive the seed-corn, but loosens the ground thoroughly, thus securing the rapid and successful germination of the seed. Another advantage claimed for this furrowing-plow is that it is so constructed that it can be driven within a few feet of the fence, thus economizing the land. It is very easily shifted, and thus saves much of the time and labor usually consumed in turning a team at the end of the rows. Besides, it is a very economical plow, and can be manufactured at so small a cost as to bring it within the means of the poorer class of farmers.

Having described my invention, what I claim therein as new, and desire to secure by Letters Patent, is—

The marking-sled with the mold-boards or shares attached to the runners, substantially as described and represented.

JOSEPH PLUMB.

Witnesses:
P. A. STROBEL,
JOHN F. STROBEL.